US009635194B2

(12) United States Patent
Morishita et al.

(10) Patent No.: US 9,635,194 B2
(45) Date of Patent: Apr. 25, 2017

(54) INFORMATION PROCESSING METHOD AND PROGRAM THEREOF FOR CONVERTING PRINT DATA INTO A DATA FORMAT SUITABLE FOR A GENERAL PURPOSE OPERATING SYSTEM

(71) Applicants: Masatoshi Morishita, Tokyo (JP); Koichi Osada, Tokyo (JP)

(72) Inventors: Masatoshi Morishita, Tokyo (JP); Koichi Osada, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/549,048

(22) Filed: Nov. 20, 2014

(65) Prior Publication Data

US 2015/0181049 A1    Jun. 25, 2015

(30) Foreign Application Priority Data

Dec. 20, 2013    (JP) .................................. 2013-264029

(51) Int. Cl.
*G06F 3/12*    (2006.01)
*H04N 1/00*    (2006.01)

(52) U.S. Cl.
CPC ........... *H04N 1/001* (2013.01); *G06F 3/1204* (2013.01); *G06F 3/126* (2013.01); *G06F 3/1241* (2013.01); *G06F 3/1288* (2013.01)

(58) Field of Classification Search
CPC ................. G06F 3/12; G06F 7/06; G06F 7/08
See application file for complete search history.

(56) References Cited

U.S. PATENT DOCUMENTS

| 2001/0002957 | A1* | 6/2001 | Noda ..................... G06K 15/00 400/61 |
| 2005/0213148 | A1* | 9/2005 | Gong .......................... 358/1.15 |
| 2006/0055952 | A1* | 3/2006 | Ferlitsch ............ G06K 15/1856 358/1.13 |
| 2006/0055974 | A1* | 3/2006 | Yamaguchi .................. 358/1.16 |
| 2012/0162689 | A1* | 6/2012 | Hayashi ............... G06F 3/1215 358/1.14 |

FOREIGN PATENT DOCUMENTS

| JP | 2008-137278 | 6/2008 |
| JP | 2013-077129 | 4/2013 |

* cited by examiner

*Primary Examiner* — Henok A Shiferaw
(74) *Attorney, Agent, or Firm* — Harness, Dickey & Pierce, P.L.C.

(57) ABSTRACT

A non-transitory computer-readable storage medium stores a program for causing a computer in an information processing apparatus to perform a process of processing print data, which includes plural pages, by a general-purpose operating system and transmitting the processed print data to a printing apparatus. The process includes a reception step of receiving serially the plural pages included in the print data; a generation step of generating a file including a predetermined number of pages and information indicating an order of files corresponding to an order of pages in the print data each time the predetermined number of pages are received at the reception step, wherein the generation step includes an insertion step of inserting into a final page of the print data a statement indicating the final page when the final page is received; and an output step of outputting the file to the general-purpose operating system.

12 Claims, 9 Drawing Sheets

INFORMATION PROCESSING METHOD AND PROGRAM THEREOF FOR CONVERTING PRINT DATA INTO A DATA FORMAT SUITABLE FOR A GENERAL PURPOSE OPERATING SYSTEM

BACKGROUND OF THE INVENTION

1. Field of the Invention

The disclosures herein generally relate to an information processing method and a program thereof.

2. Description of the Related Art

Recently, performing data processing on an open system has become popular. On the other hand, printing in large volume has been realized in a host system environment, and it has been required to realize the printing in large volume also in an open system environment.

In the case of a general-purpose OS (Operating System) used in the open system environment such as Windows (trademark registered), a size of print data is restricted within a predetermined range. Accordingly, when a printing in large volume is performed via the general-purpose OS, it is necessary to divide print data in advance on an upstream side of the general-purpose OS.

However, there has been a problem that when the print data are divided into plural print jobs, an order of the print jobs output from the general-purpose OS sometimes disagrees with the order of the print jobs upon division. Accordingly, on the downstream side of the general-purpose OS, a process of correcting the order of the print jobs output from the general-purpose OS to the order of the print jobs upon division is required.

For the above-described problem, for example, Japanese Published Patent Application No. 2013-077129 discloses dividing print data into plural print jobs on the upstream side of the general-purpose OS and rearranging the print data in a desired order on the downstream side of the general-purpose OS.

SUMMARY OF THE INVENTION

It is a general object of at least one embodiment of the present invention to provide an information processing method and a program thereof that substantially obviate one or more problems caused by the limitations and disadvantages of the related art.

In one embodiment, a non-transitory computer-readable storage medium stores a program for causing a computer in an information processing apparatus to perform a process of processing print data, which includes a plurality of pages, by a general-purpose operating system and transmitting the processed print data to a printing apparatus. The process includes a reception step of receiving the plurality of pages included in the print data serially from a head page; a generation step of generating a file including a predetermined number of pages each time the predetermined number of pages are received at the reception step, the file including information indicating an order of files corresponding to an order of pages in the print data, wherein the generation step includes an insertion step of inserting into a final page of the print data a statement indicating the final page when the final page is received at the reception step; and an output step of outputting the file to the general-purpose operating system.

In another embodiment, a non-transitory computer-readable storage medium stores a program for causing a computer in an information processing apparatus to perform a process of processing print data, which includes a plurality of pages, by a general-purpose operating system and transmitting the processed print data to a printing apparatus. The process includes a storage step of storing serially a plurality of processed files received from the general-purpose operating system which processes a plurality of files divided from the print data to output the plurality of processed files; a transmission step of retrieving the processed files stored at the storage step in an order of the files corresponding to an order of pages in the print data with reference to information included in each of the processed files, the information indicating the order of the files, and transmitting the retrieved processed files serially to the printing apparatus; and a determination step of determining that a retrieved processed file is a final processed file of the processed print data when the statement indicating the final page is detected from a page which is incorporated in the retrieved processed file.

In yet another embodiment, an information processing method is executed in an information processing apparatus for processing print data, which includes a plurality of pages, by a general-purpose operating system and transmitting the processed print file to a printing apparatus. The method includes receiving the plurality of pages included in the print data serially from a head page; generating a file including a predetermined number of pages each time the predetermined number of pages are received, the file including information indicating an order of files corresponding to an order of pages in the print data, wherein a statement indicating a final page is inserted into the final page of the print data when the final page is received; outputting the file to the general-purpose operating system; storing serially a plurality of processed files received from the general-purpose operating system which processes the plurality of files to output the plurality of processed files; retrieving the stored processed files in the order of the files corresponding to the order of pages in the print data with reference to information included in each of the processed files, the information indicating the order of the files; transmitting the retrieved processed files serially to the printing apparatus; and determining that a retrieved processed file is a final processed file of the processed print data when the statement indicating the final page is detected from a page incorporated in the retrieved processed file.

According to respective embodiment of the present invention, which will be described as follows, a printing process can be performed at high speed and with low cost.

BRIEF DESCRIPTION OF THE DRAWINGS

Other objects and further features of embodiments will be apparent from the following detailed description when read in conjunction with the accompanying drawings, in which.

DESCRIPTION OF THE PREFERRED EMBODIMENTS

In the following, embodiments of the present invention will be described with reference to the accompanying drawings. Meanwhile, in the specification and drawings of the present application, to members having substantially the same function configurations the same reference numerals are assigned and a duplicate explanation will be omitted.

[First Embodiment]

<1. Overall Configuration of Information Processing System>

Figure 1:
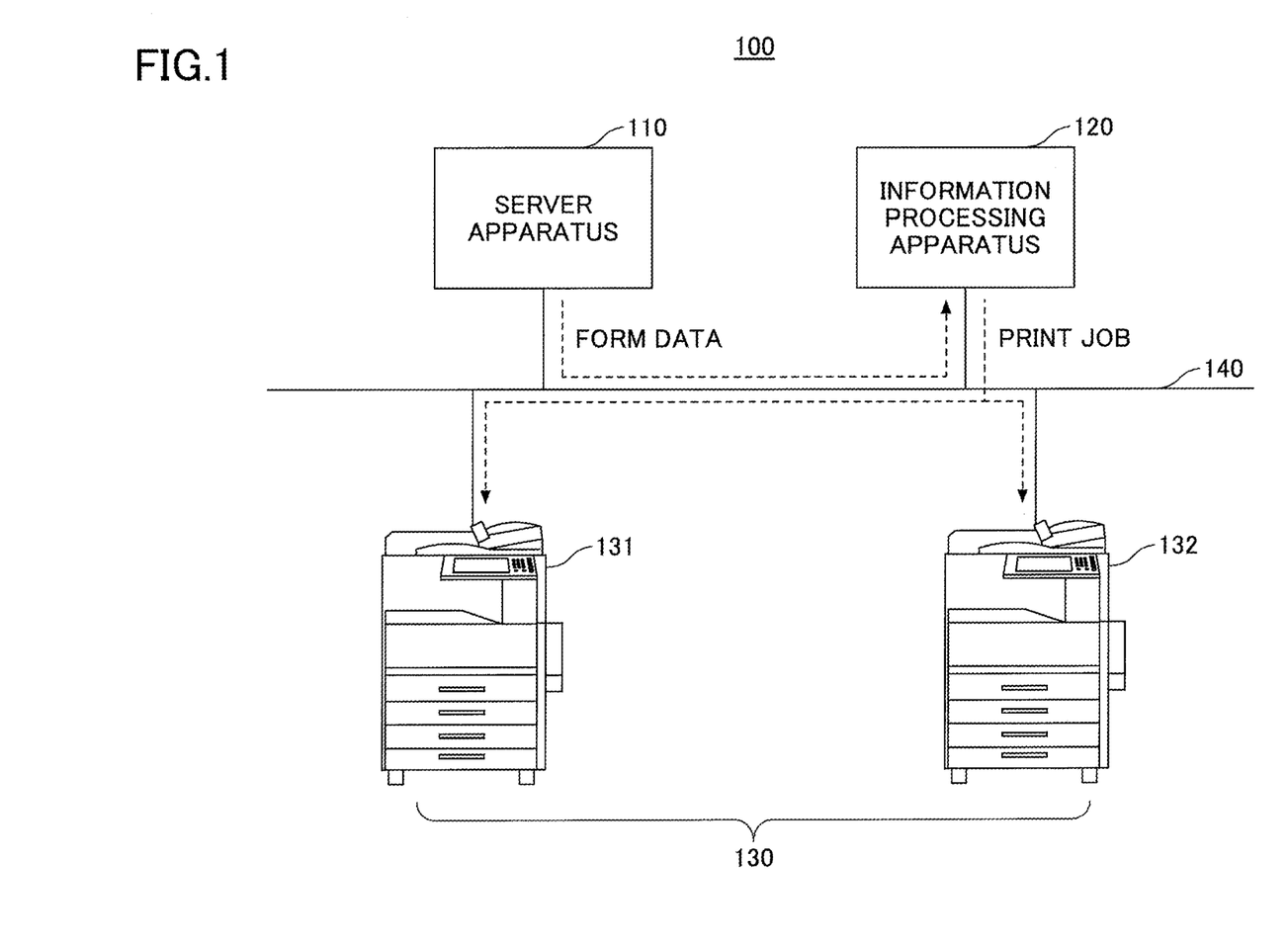
FIG. 1 is a diagram illustrating an example of an information processing system including an information processing apparatus according to a present embodiment.

At first, a system configuration of an information processing system including an information processing apparatus according to the present embodiment will be explained. FIG. 1 is a diagram illustrating an example of the system configuration of the information processing system 100 including the information processing apparatus 120 according to the present embodiment.

As shown in FIG. 1, the information processing system 100 includes a server apparatus 110, the information processing apparatus 120 and a printing apparatus group 130. The respective apparatuses are connected with each other via a network 140.

The server apparatus 110 stores and manages print data to be printed (form data, in this example). The server apparatus 110, based on an instruction by a user, can cause the form data to be printed out from the printing apparatus group 130 via the information processing apparatus 120.

The information processing apparatus 120 converts form data transmitted from the server apparatus 110 in a data format suitable for the printing apparatus group 130, divides the data into plural print jobs and serially sends them to the printing apparatus group 130.

The printing apparatus group 130 includes printing apparatuses 131, 132, such as printers or MFPs (Multifunction Peripherals) which are provided with printing functions. The printing apparatuses 131, 132 perform print process based on an instruction by the information processing apparatus 120. Meanwhile, FIG. 1 illustrates an example of the printing apparatuses 131, 132 which are connected to the network 140. However, the number of the printing apparatuses connected to the network 140 is not limited to this.

<2. Hardware Configuration of Information Processing Apparatus>

Figure 2:
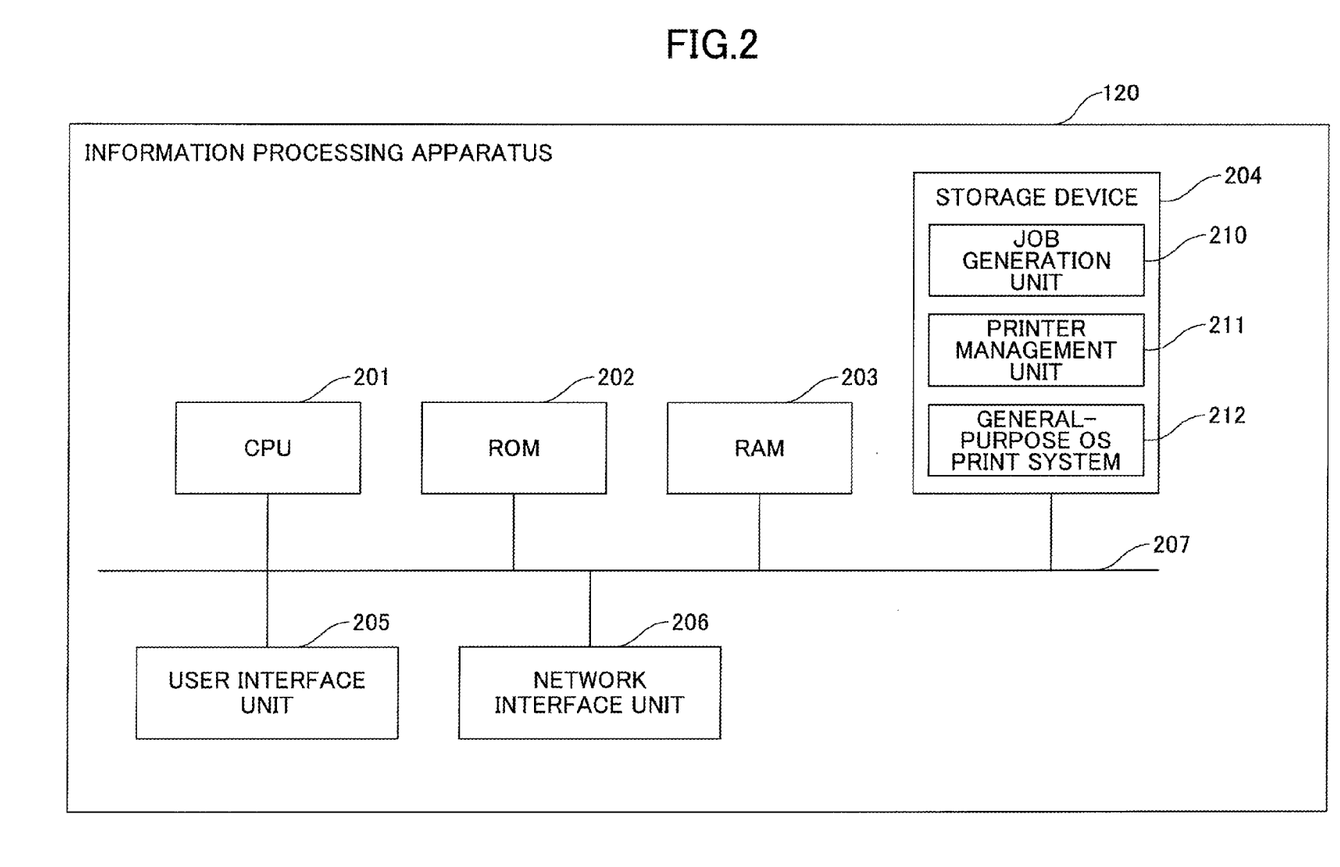
FIG. 2 is a diagram illustrating an example of a hardware configuration of the information processing apparatus according to the present embodiment.

Next, the hardware configuration of the information processing apparatus 120 will be explained. FIG. 2 is a diagram illustrating the hardware configuration of the information processing apparatus 120.

As shown in FIG. 2, the information processing apparatus 120 includes a CPU (Central Processing Unit) 201, a ROM (Read-Only Memory) 202, a RAM (Random Access Memory) 203, a storage device 204, a user interface unit 205 and a network interface unit 206. Meanwhile, the respective elements included in the information processing apparatus 120 are assumed to be connected with each other via a bus 207.

The CPU 201 executes various programs stored in the ROM 202 or the storage device 204 using the RAM 203 as a work area, to control the whole information processing apparatus 120.

The storage device 204 is a non-volatile storage medium and stores a program which functions as a job generation unit 210 when the CPU executes the program and a program which functions as a printer management unit 211 when the CPU executes the program. Moreover, the storage device 204 stores a program that functions as a general-purpose OS print system 212 responsible for a print process out of the general-purpose operating system (OS) such as Windows (trademark registered). Meanwhile, function configurations of the job generation unit 210 and the printer management unit 211 will be explained later in detail.

The user interface unit 205 is provided with an operation unit which a user uses upon performing various operations. Moreover, the user interface unit 205 is provided with a display unit that displays an internal state of the information processing apparatus 120 and various information obtained by communicating with the printing apparatus group 130.

The network interface unit 206 is a connection unit for communicating with the server apparatus 110 or the printing apparatus group 130 via the network 140.

<3. Flow of Print Data in Information Processing System>

Figure 3:
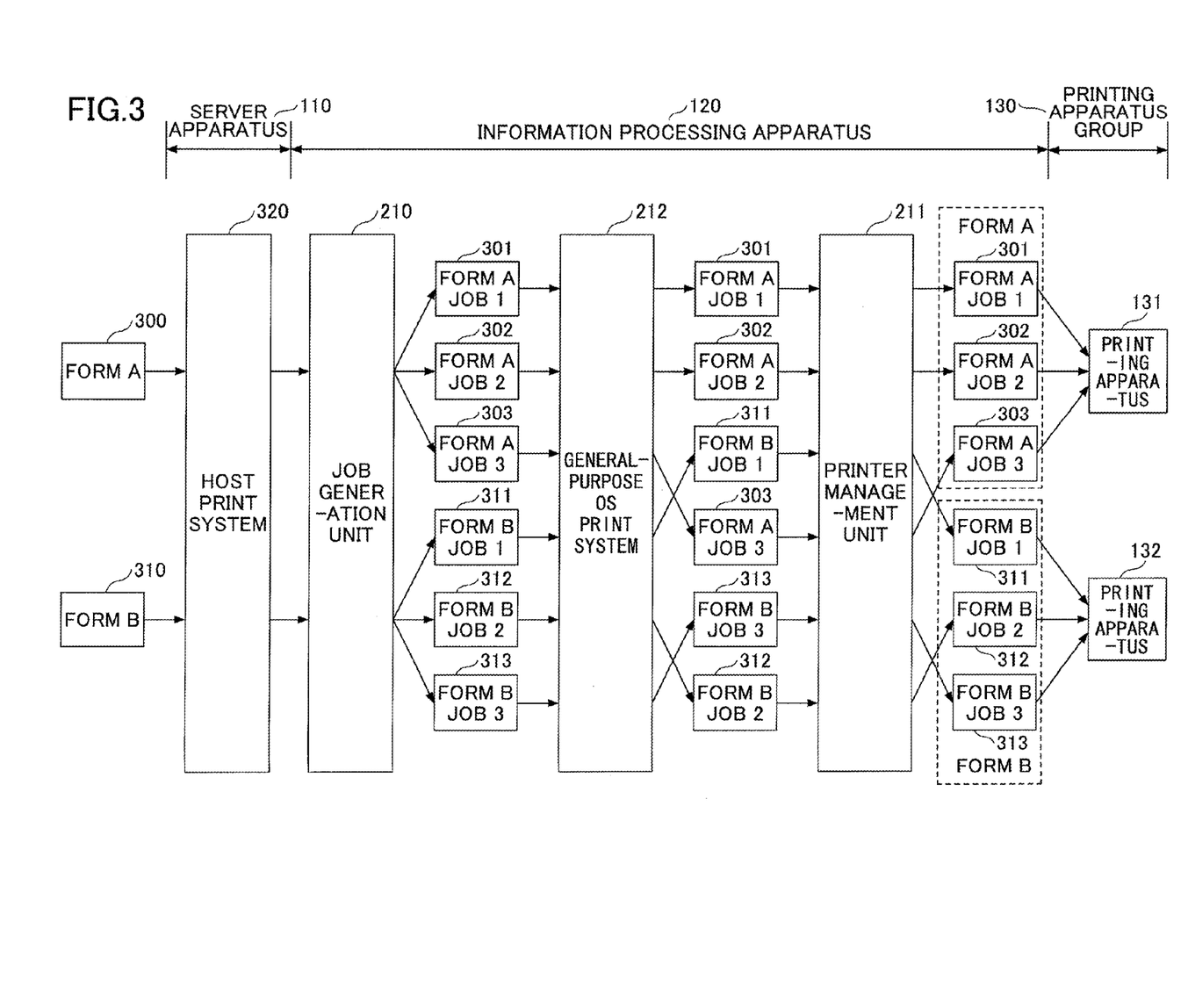
FIG. 3 is a diagram illustrating an example of a flow of print data in the information processing system according to the present embodiment.

Next, a flow of print data (form data in the present embodiment) in the information processing system 100 will be explained. FIG. 3 is a diagram for explaining the flow of print data in the information processing system 100.

As shown in FIG. 3, form data 300 having a form identifier "A" and form data 310 having a form identifier "B" which are stored and managed in the server apparatus 110 are sent to the information processing apparatus 120 via a host print system 320 in the server apparatus 110.

In the information processing apparatus 120, the job generation unit 210 receives the form data 300 and divides them into plural print jobs (files). This is because a size of print data that can be processed in the general-purpose OS print system 212 is restricted (for example, up to 4 GB). Moreover, this is also because a degradation of performance by the general-purpose OS print system 212 due to a large size of the print data is required to be avoided. Accordingly, the job generation unit 210 divides each of the form data 300 and the form data 310 into plural print jobs which are less than or equal to 4 GB respectively.

FIG. 3 illustrates an example in which the form data 300 are divided into three parts of print jobs 301 to 303. Moreover, in this example the form data 310 are divided into three parts of print jobs 311 to 313. Meanwhile, job numbers (identifiers) of "form A job 1", "form A job 2" and "form A job 3" are assumed to be attached respectively to the print jobs 301 to 303. Similarly, job numbers (identifiers) of "form B job 1", "form B job 2" and "form B job 3" are assumed to be attached respectively to the print jobs 311 to 313.

The print jobs 301 to 303 obtained by division in the job generation unit 210 are input to the general-purpose OS print system 212, and various processes, which are required for the printing apparatuses 131 and 132 printing out, are performed for the print jobs 301 to 303. Similarly, the print jobs 311 to 313 obtained by division in the job generation unit 210 are input to the general-purpose OS print system 212, and the various processes required for the printing out are performed for the print jobs 311 to 313.

At this time, the general-purpose OS print system 212 doesn't necessarily output in the order the received print jobs are input. The general-purpose OS print system 212 may output the print jobs in a different order from the input order. FIG. 3 illustrates an example that the print jobs are input to the general-purpose OS print system 212 in the order of 301, 302, 303, 311, 312 and 313.

On the other hand, the general-purpose OS print system 212 outputs the print jobs in the order of 301, 302, 311, 303, 313 and 312.

The printer management unit 211 outputs the print jobs 301 to 303 out of the print jobs 301 to 313 received from the general-purpose OS print system 212 to the printing apparatus 132 in the order of the print jobs upon division.

As is clear from the above explanations, in the open system environment a size of print data that the general-purpose OS print system 212 can process is restricted. For this reason, an application located on the upstream side of the general-purpose OS print system 212 (job generation unit 210 in FIG. 3) divides the print data and generates plural print jobs. Furthermore, an application located on the downstream side of the general-purpose OS print system 212 (printer management unit 211 in FIG. 3) rearranges the print jobs output from the general-purpose OS print system 212 in the order upon division and send the rearranged print jobs to the printing apparatuses 131 and 132.

<4. Outline of Functions of Job Generation Unit and Printer Management Unit>

Next, an outline of functions of the job generation unit 210 and the printer management unit 211 will be explained. The purposes of the job generation unit and the printer management unit according to the present embodiment in realizing flows of print data as shown in FIG. 3 are as follows.

1. A speed of print processing of the entire information processing system 100 is improved.

2. Print jobs can be transmitted on the downstream side in order upon division without a dedicated application intervening between the upstream side and the downstream side of the general-purpose OS print system 212 for passing various processing information.

In order to achieve the above purposes, in the information processing apparatus 120 according to the present embodiment, the job generation unit 210 (upstream side application) and the printer management unit 211 (downstream side application) are provided respectively with the following functions:

(a) The job generation unit 210 (upstream side application) is provided with:

a function of sending print jobs serially to the general-purpose OS printing system 212 each time the print job is divided from the receive print data, i.e. executing processing in a unit of the print job; and a function of inserting information to be passed to the printer management unit 211 into a predetermined page of the print job upon division the print data.

(b) The printer management unit 211 (downstream side application) is provided with:

a function of outputting print jobs which are received from the general-purpose OS print system 212 as they are when the order of the print jobs is the order upon division;

a function of temporarily halting the output process of the print jobs when the order is different from the order upon division until it becomes possible to output the print jobs in the correct order; and a function of extracting the information inserted into the predetermined page in the print job and determining whether the print job is the final print job.

Here, when the job generation unit 210 and the printer management unit 211 are provided with the above-described functions, there are restrictions as follows.

(1) Since the processing is executed in a unit of the print job, at the time the job generation unit 210 recognizes the final page of the print data and a total number of pages of the print data and a number of a division are fixed, generated print jobs have been sent to the general-purpose OS print system 212. For this reason, various processing information such as the total number of pages or the number of division cannot be inserted into a print job before the print job including the final page of the print data.

(2) The printer management unit 211 cannot acquire the order of the print jobs upon division unless the order upon division is attached to the print job. Moreover, the printer management unit 211 cannot identify a final print job unless information for identifying the final print job in plural print jobs divided from the same print data is inserted. In this case the printer management unit 211 cannot determine whether to proceed to processing for the next print data, i.e. whether to wait for print jobs of the previous print data.

Therefore, in order to respond to the above restrictions, the job generation unit 210 and the printer management unit 211 execute the following processing:

(a) In the job generation unit 210, appending information indicating the order upon division to a print job each time the print data is divided to generate the print job, and inserting information indicating the final page into the final page of the print data; and (b) In the printer management unit 211, controlling the transmission of print jobs to the printing apparatus 131 based on the information indicating the order upon division appended to each of the print jobs; and determining whether the information indicating the final page is included in each page in the received print job, and, if the information indicating the final page is included, determining that the print process of the print data ends when the print job including the page is sent to the printing apparatus 131, and proceeds to the print process of the next print data.

<5. Detailed Configuration of Job Generation Unit>

Next, a detailed configuration of the job generation unit 210 that executes the above processes will be explained in detail.

<5.1 Function Configuration of Job Generation Unit>

Figure 4:
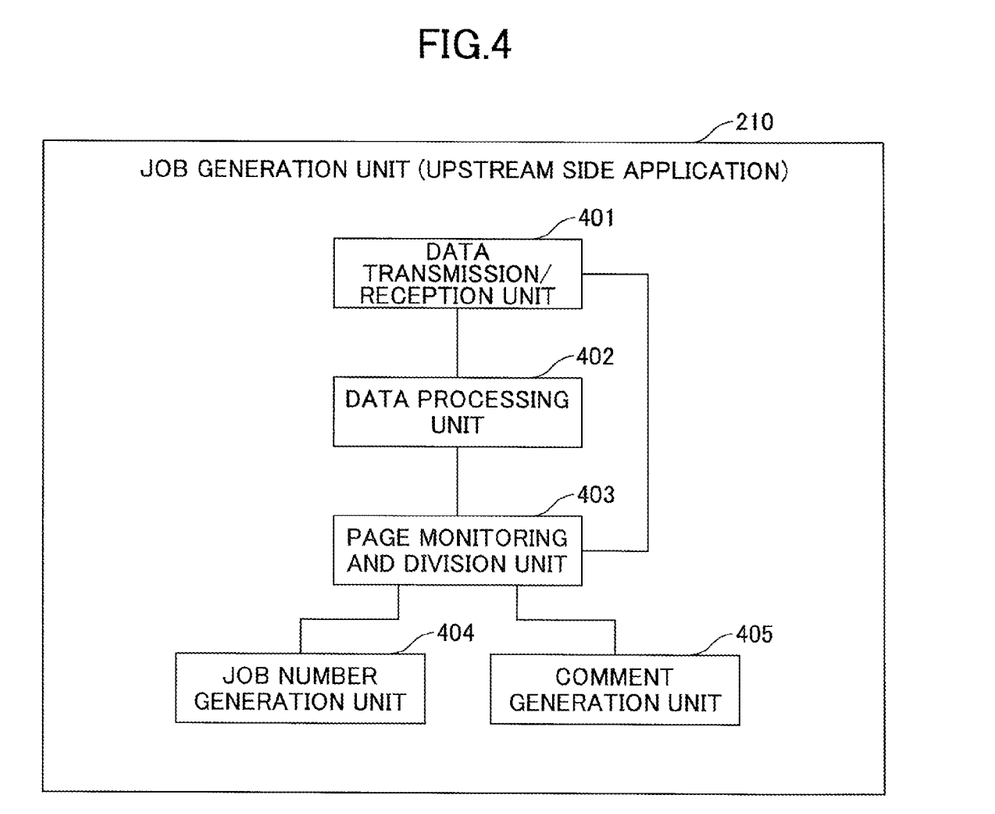
FIG. 4 is a diagram illustrating an example of a function configuration of a job generation unit (upstream side application) according to the present embodiment.

First, a function configuration of the job generation unit 210 will be explained. FIG. 4 is a diagram illustrating an example of the function configuration in detail of the job generation unit 210. As shown in FIG. 4, the job generation unit 210 includes a data transmission/reception unit 401, a data processing unit 402, a page monitoring and division unit 403, a job number generation unit 404 and a comment generation unit 405.

The data transmission/reception unit 401 receives form data 300 and form data 310 from the server apparatus 110 as print data. Moreover, the print jobs 301 to 303 which are generated by division the print data are output to the general-purpose OS print system 212.

The data processing unit 402 serially converts print data received by the data transmission/reception unit 401 into a data format suitable for processing by the general-purpose OS print system 212.

The page monitoring and division unit 403 divides the converted print data into plural print jobs. Specifically, a first print job is generated. Then, in the data processing unit 402, a number of pages of the converted print data is serially counted, and the counted page is incorporated into the first print job until the page number reaches the predetermined page number (a page number corresponding to the size of 4 GB). Afterwards, when the page number reaches the predetermined page number, a second print job is generated, for the rest of the pages until the page number reaches the predetermined page number, the page number of the print data is counted and the counted pages are serially incorporated into the print job. By repeating the above process the print data can be divided into plural print jobs.

The job number generation unit 404 generates a job number each time a print job is generated at the page monitoring and division unit 403. The generated job number is appended to the print job by the page monitoring and division unit 403.

In the process of dividing the print data into plural print jobs executed at the page monitoring and division unit 403, the comment generation unit 405 generates a comment (statement) to be inserted into the final page, when the process reaches the final page of the print data. The generated comment is inserted into the final page by the page monitoring and division unit 403.

Figure 5:
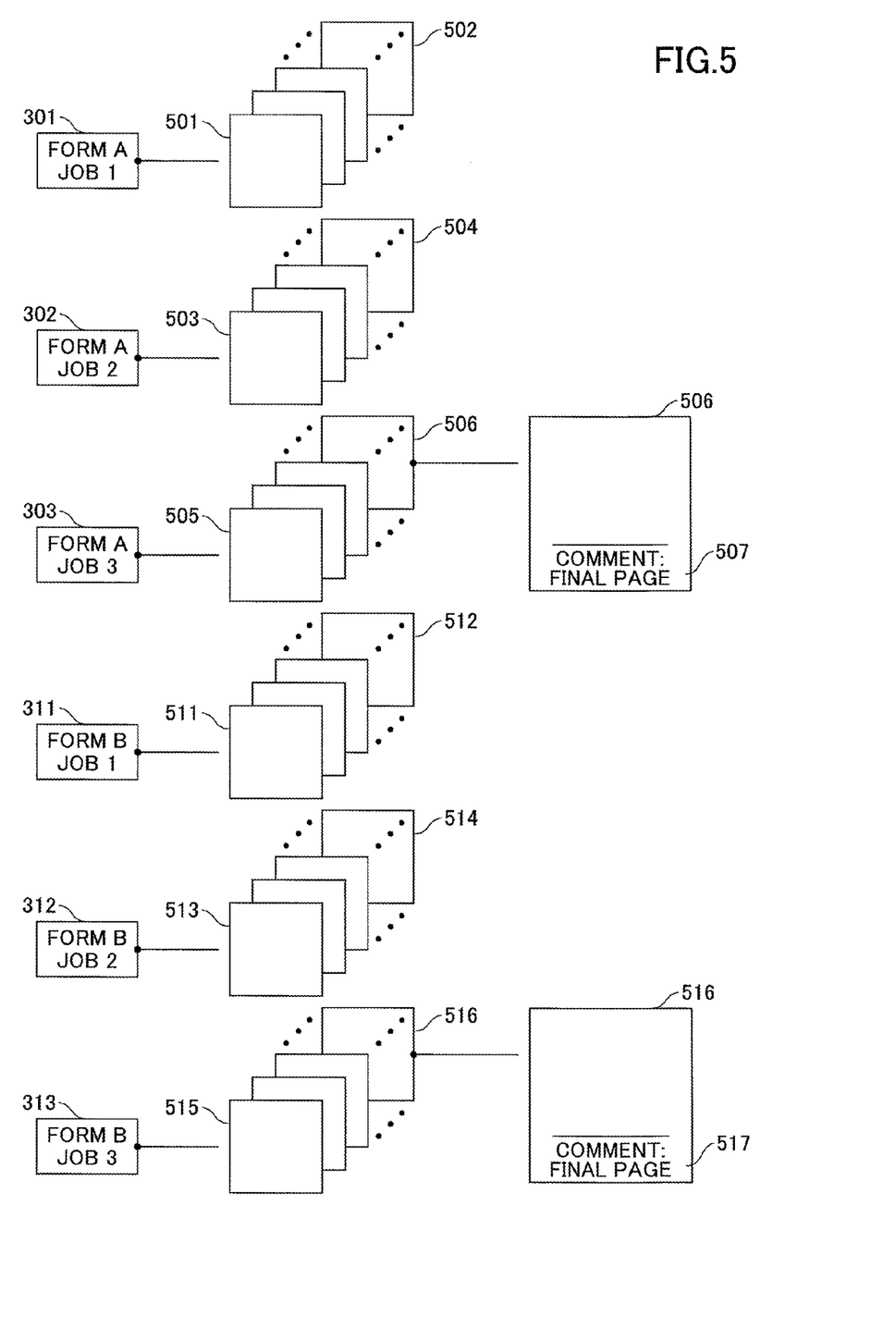
FIG. 5 is a diagram schematically illustrating an example of a process in the job generation unit according to the present embodiment.

FIG. 5 is a diagram schematically illustrating an example of the print jobs 301 to 313 generated at the job generation unit 210. FIG. 5 illustrates an example in which the job generation process is executed for the form data 300 including 8500 pages (form identifier is "A") and the form data 310 including 6200 pages (form identifier is "B") as the print data. Meanwhile, a form data of 3000 pages is assumed to have a size of 4 GB.

As shown in FIG. 5, the job numbers attached to the print jobs 301 to 313 include the form identifier indicating the print data before division and information indicating orders of the print jobs upon division. For example, the job number "form A job 1" represents that the print data before division is the form data with the form identifier of "A" and it is a print job generated first upon division. Similarly, the job numbers "form A job 2" and "form A job 3" represent the print jobs generated second and third, respectively.

On the other hand, the job number "form B job 1" represents that the print data before division is the form data with the form identifier of "B" and it is a print job generated first upon division. Similarly, the job numbers "form B job 2" and "form B job 3" represent the print jobs generated second and third, respectively.

Moreover, as shown in FIG. 5, in the print job 301, respective pages from the first page of the print data (reference numeral 501 indicating the first page) to the 3000th page (reference numeral 502) are incorporated. Similarly, in the print job 302, respective pages from the 3001st page (reference numeral 503) to the 6000th page (reference numeral 504) are incorporated. Furthermore, in the print job 303, respective pages from the 6001st page (reference numeral 505) to the 8500th page (reference numeral 506) are incorporated.

On the other hand, in the print job 311, respective pages from the first page of the print data (reference numeral 511 indicating the first page) to the 3000th page (reference numeral 512) are incorporated. Similarly, in the print job 312, respective pages from the 3001st page (reference numeral 513) to the 6000th page (reference numeral 514) are incorporated. Furthermore, in the print job 313, respective pages from the 6001st page (reference numeral 515) to the 6200th page (reference numeral 516) are incorporated.

Furthermore, as shown in FIG. 5, in the final page (8500th page, reference numeral 506) incorporated in the print job 303, a description indicating the final page is inserted as a comment 507. Similarly, in the final page (6200th page, reference numeral 516) incorporated in the print job 313, a description indicating the final page is inserted as a comment 517.

<5.2 Flow of Job Generation Process in Job Generation Unit>

Figure 6:
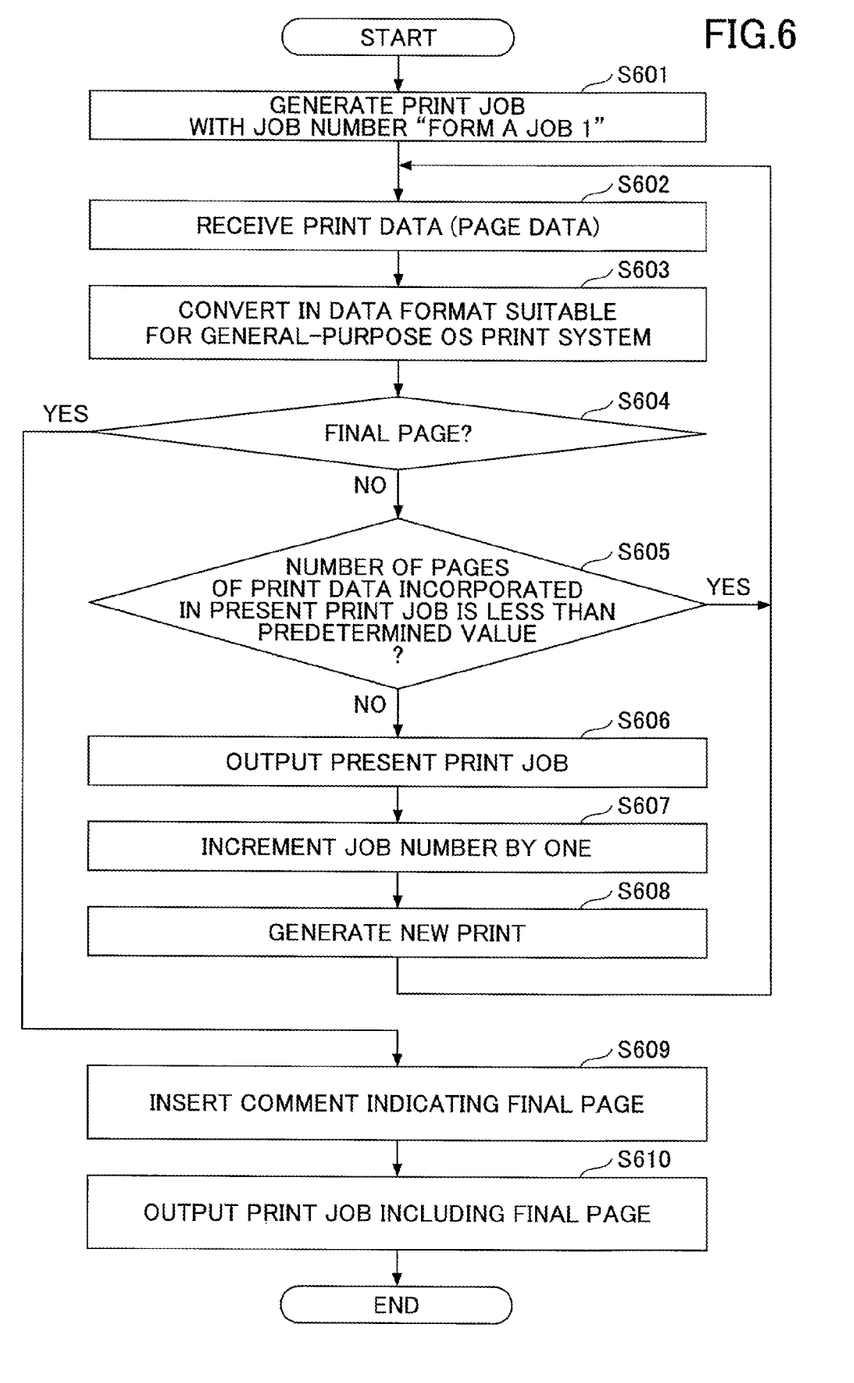
FIG. 6 is a flowchart illustrating an example of a flow of a job generation process in the job generation unit according to the present embodiment.

Next, a flow of the job generation process in the job generation unit 210 will be explained. FIG. 6 is a flowchart illustrating the flow of the job generation process in the job generation unit 210. Meanwhile, in order to simplify explanations in the present embodiment, an example of transmitting form data 300 as the print data from the server apparatus 110 will be illustrated.

The job number generation unit 404 generates a job number "form A job 1" and the page monitoring and division unit 403 generates a print job to which the generated job number is attached (step S601). The data transmission/reception unit 401 receives the form data 300 from the server apparatus 110 serially from the first page (step S602). The data processing unit 402 converts the form data 300 received by the data transmission/reception unit 401 in a data format suitable for the general-purpose OS print system 212 (step S603).

The page monitoring and division unit 403 determines whether the page converted at step S603 is a final page of the form data 300 (step S604). When the converted page is the final page (step S604: YES), the process proceeds to step S609.

On the other hand, when the converted page is not the final page (step S604: NO), the process proceeds to step S605. At step S605, the page monitoring and division unit 403 determines whether a number of pages of the print data incorporated in the present print job (with the job number "form A job 1") is less than a predetermined value (for example, a number of pages corresponding to 4 GB).

When the number of pages is less than the predetermined value (step S605: YES), the page converted at step S603 is incorporated into the present print job (with the job number "form A job 1") and the process returns to step S602.

When the number of pages is equal to the predetermined value (step S605: NO), the process proceeds to step S606. At step S606, the page monitoring and division unit 403 incorporates the page converted at step S603 into the present print job (with the job number "form A job 1") and the data transmission/reception unit 401 outputs the present print job to the general-purpose OS print system 212.

The job number generation unit 404 increments the job number by one (step S607) to newly generate a job number. In the present example, a job number "form A job 2" is generated. The page monitoring and division unit 403 generates a new print job and attaches the newly generated job number by the job number generation unit 404 to the new print job (step S608). Then the process returns to step S602.

In this way, by repeating the processes at steps S602 to S608 the print job 301, the print job 302 and the print job 303 are serially generated.

On the other hand, when the converted page is determined to be the final page (step S604: YES), the comment generation unit 405 generates information (comment) indicating the final page, which is inserted into the final page by the page monitoring and division unit 403 (step S609).

The page monitoring and division unit 403 incorporates the final page into the print job (with the job number "form A job 3"), and the data transmission/reception unit 401 outputs the print job in which the final page is incorporated to the general-purpose OS print system 212 (step S610). Meanwhile, the data transmission/reception unit 401 may output the print jobs to the general-purpose OS print system 212 in an arbitrary order.

<6. Detailed Configuration of Printer Management Unit>

Next, a detailed configuration of the printer management unit 211 that executes the above-described processes will be explained.

<6.1 Function Configuration of Printer Management Unit>

Figure 7:
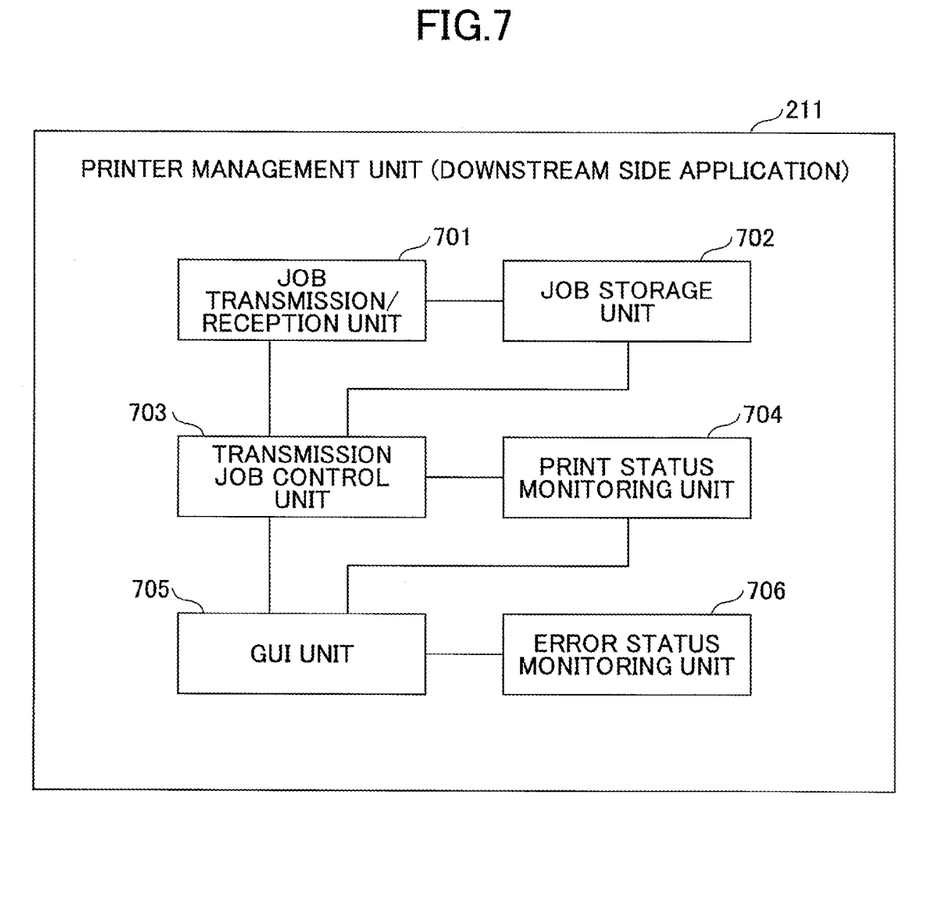
FIG. 7 is a diagram illustrating an example of a function configuration of a printer management unit (downstream side application) according to the present embodiment.

First, a function configuration of the printer management unit 211 will be explained. FIG. 7 is a diagram illustrating a detailed function configuration of the printer management unit 211. As shown in FIG. 7, the printer management unit 211 includes a job transmission/reception unit 701, a job storage unit 702, a transmission job control unit 703, a print status monitoring unit 704, a GUI unit 705 and an error status monitoring unit 706.

The job transmission/reception unit 701 receives a print job output from the general-purpose OS print system 212. Moreover, transmission job control unit 703 controls a transmission order of the print jobs, and the job transmission/reception unit 701 transmits the controlled print jobs to the printing apparatuses 131 and 132.

The job storage unit 702 stores the print job output from the general-purpose OS print system 212 and received by the job transmission/reception unit 701 in the storage device 204.

The transmission job control unit 703 controls the print jobs, which the job storage unit 702 stores in the storage device 204, so as to be transmitted in the order of the print jobs upon division. Specifically, the transmission job control unit 703 searches in the storage device 204 at a predetermined timing. When the print jobs in the order of the print jobs upon division are stored in the storage device 204, the transmission job control unit 703 reads the print jobs and transmits them to the job transmission/reception unit 701. Meanwhile, the job transmission/reception unit 701 transmits the print jobs to the printing apparatuses 131 and 132 according to the order of the print jobs transmitted from the transmission job control unit 703.

The print status monitoring unit 704 monitors a print status of the printing apparatuses 131 and 132 by communicating with the printing apparatuses 131 and 132. When the printing apparatus 131 or 132 ends a process for the print jobs, the print status monitoring unit 704 gives notice that the process ends to the transmission job control unit 703. Receiving the notice from the print status monitoring unit 704 the transmission job control unit 703 controls the next print jobs to be transmitted to the printing apparatus 131 or 132.

The GUI unit 705 provides to a user an operation screen for performing various operations to the information processing apparatus 120. Meanwhile, operation content input by the user via the provided operation screen is sent to the transmission job control unit 703. The transmission job control unit 703 controls the transmission of the print jobs according to the operation content by the user. Moreover, the GUI unit 705 displays a print status of the printing apparatuses 131 and 132 monitored by the print status monitoring unit 704. Furthermore, the GUI unit 705 displays an error status of the printing apparatuses 131 and 132 monitored by the error status monitoring unit 706.

The error status monitoring unit 706 monitors the error status of the printing apparatuses 131 and 132 by communicating with the printing apparatuses 131 and 132. The error status monitoring unit 706 gives notice to the GUI unit 705 when an error occurs in the printing apparatus 131 or 132. The GUI unit 705 in response to the notice from the error status monitoring unit 706 display the error status.

<6.2 Detailed Function of GUI Unit>

Next, a detailed function of the GUI unit 705 will be explained. The GUI unit 705 provides a screen according to the result of monitoring by the print status monitoring unit 704, the result of monitoring by the error status monitoring unit 706 or the like.

Specifically, when a size or a name of a paper to be printed is changed during the print process is executed, the GUI unit 705 displays a "paper change screen" and a "print page specification screen". The "paper change screen" promotes the user to change the paper. The user specifies a print start page via the "print page specification screen".

When the user changes the paper following a display in the paper change screen and specifies the print start page via the print page specification screen, the transmission job control unit 703 controls the print process starting from the specified page according to the specification.

Moreover, the print page specification screen is also displayed when a paper jam or a paper out occurs. For the print start page when the paper jam or the paper out occurs the page number at the time of the error is input as a default value. Accordingly, the user can restart the continued print process from the page at which the error occurs only by instructing a re-execution of the print process. Meanwhile, the user can restart the print process from an arbitrary page by cancelling the default value and inputting a page number separately.

Furthermore, the print page specification screen can be displayed by the user operating manually. Also in this case, the user can re-execute the print process from an arbitrary page. The arbitrary page, here, is assumed to include the page of the print job which has already been output to the printing apparatus 131 or 132.

<6.3 Flow of Job Transmission Control Process in Printer Management Unit>

Figure 8:
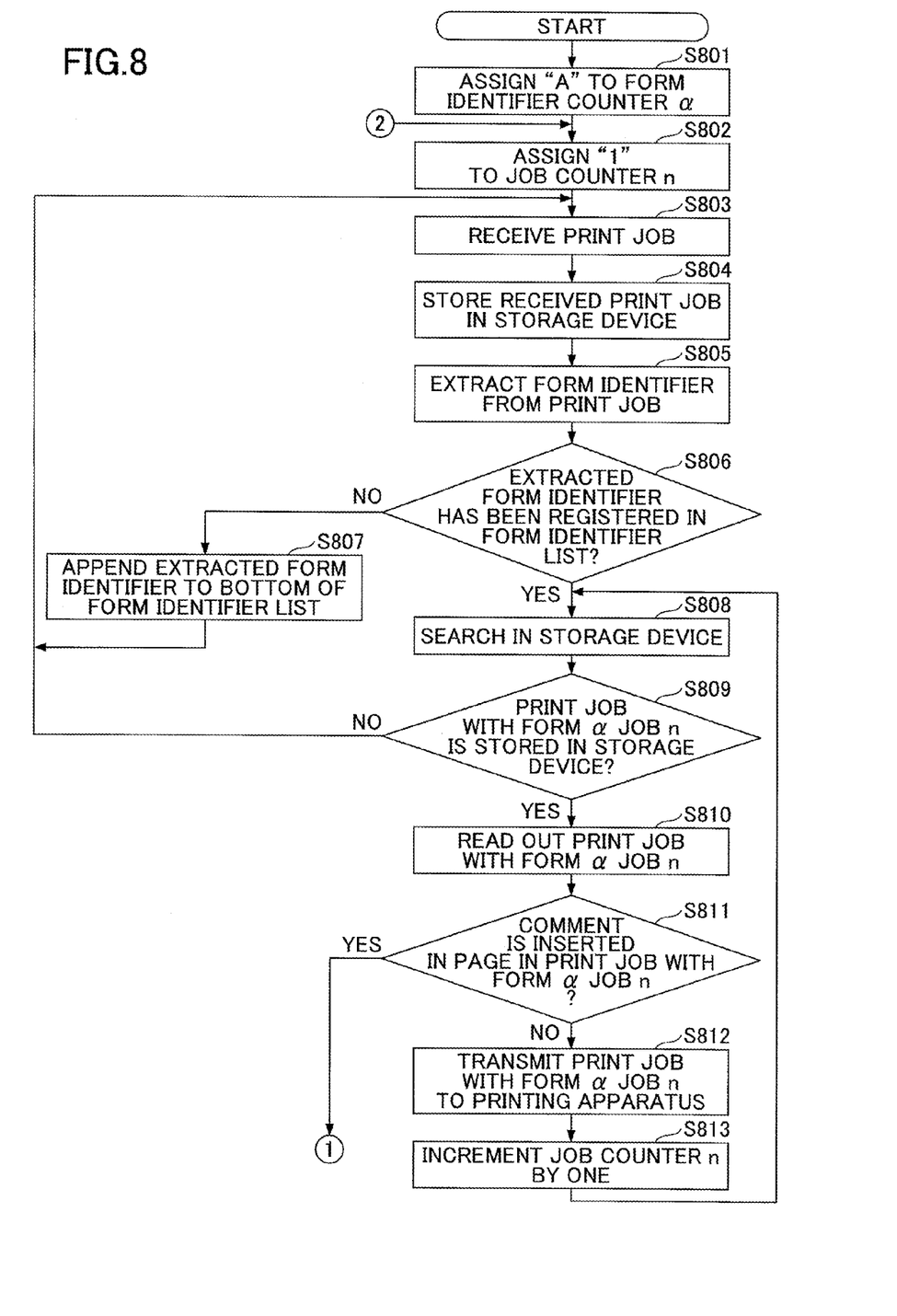
FIG. 8 is a flowchart illustrating an example of a flow of a job transmission control process in the printer management unit according to the present embodiment.
Figure 9:
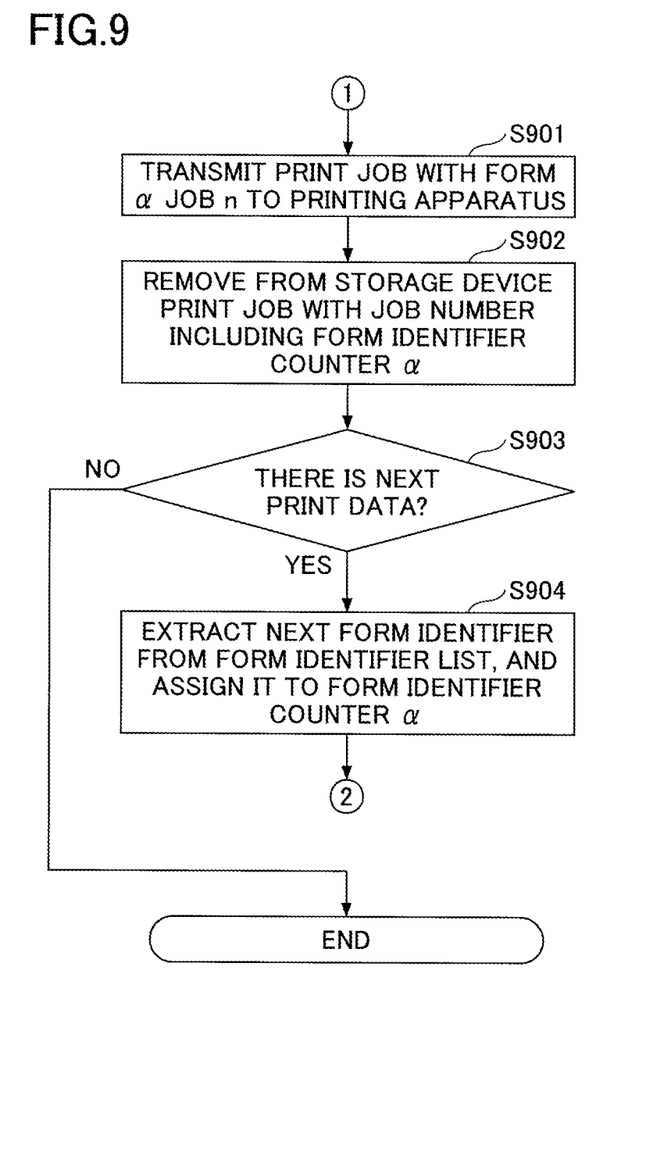
FIG. 9 is a flowchart illustrating an example of the flow of the job transmission control process in the printer management unit according to the present embodiment.

Next, a flow of a job transmission control process in the printer management unit 211 will be explained. FIGS. 8 and 9 are a flowchart illustrating the flow of the job transmission control process in the printer management unit 211. Meanwhile, in order to simplify explanations in the present embodiment, the job transmission control process in the case where the print jobs 301 to 303 are output from the general-purpose OS print system 212 will be explained.

The transmission job control unit 703 assigns "form identifier A" to a form identifier counter α (step S801). Moreover, the transmission job control unit 703 assigns "1" to a job counter n (step S802).

The job transmission/reception unit 701 serially receives print jobs from the general-purpose OS print system 212 (step S803). In the present embodiment, a print job to which a job number "form A job 1" is attached is received.

The job storage unit 702 stores the received print job in the storage device 204 (step S804).

The transmission job control unit 703 extracts the form identifier included in the job number attached to the received print job (step S805). Furthermore, the transmission job control unit 703 determines whether the extracted form identifier has been registered in a form identifier list. Meanwhile, the form identifier list is a list for managing an order of extraction for form identifiers, and form identifiers are registered by the first-in first-out (FIFO) method.

When the extracted form identifier is determined not to be registered in the form identifier list as a result of determination at step S806 (step S806: NO), the process proceeds to step S807. At step S807, the transmission job control unit 703 appends the form identifier extracted at step S805 to the bottom of the form identifier list. In the present embodiment, the form identifier "A" is appended to the bottom of the form identifier list. Meanwhile, after the form identifier is appended at step S807 the process returns to step S803.

On the other hand, when it is determined that the extracted form identifier has already been registered in the form identifier list as a result of the determination at step S806 (YES), the process proceeds to step S808.

At step S808, the transmission job control unit 703 searches in the storage device 204. Specifically, the transmission job control unit 703 searches a print job to which a job number including the form identifier counter α of "A" and the job counter n of "1" is appended.

At step S809, based on a result of the search, it is determined whether the storage device 204 stores a print job, to which the job number including the form identifier counter α of "A" and the job counter n of "1" is appended. When the above-described print job is determined not to be stored in the storage device 204 at step S809 (NO), the process returns to step S803.

On the other hand, when it is determined that the above-described print job is stored in the storage device 204 at step S809 (YES), the process proceeds to step S810. Here, the print job, to which the job number of "form A job 1" is appended, is stored in the storage device 204, and the process proceeds to step S810.

At step S810, the transmission job control unit 703 reads out the print job, to which the job number of "form A job 1" is appended, from the storage device 204.

At step S811, the transmission job control unit 703 determines whether a comment is inserted in each of the pages incorporated in the print job read out at step S810.

When it is determined that a comment is inserted at step S811 (YES), the process proceeds to step S901 in FIG. 9. On the other hand, when it is determined that any comment is not inserted (step S811: NO), the process proceeds to step S812. In the present embodiment, since a final page is not incorporated in the print job, to which the job number of "form A job 1" is appended, the process proceeds to step S812.

At step S812, the job transmission/reception unit 701 transmits the print job read out by the transmission job control unit 703 at step S810 to the printing apparatus 131. Furthermore, at step S813, the transmission job control unit 703 increments the job counter n by one. Then the process returns to step S808.

Next, the transmission job control unit 703 searches in the storage device 204 (step S809), and determines whether the storage device 204 stores a print job, to which the job number including the form identifier counter α of "A" and the job counter n of "2" is appended (step S809). When the above-described print job is determined not to be stored in the storage device 204 (step S809: NO), the processes at steps S803 to S809 are executed repeatedly. When the print job, to which the job number including the form identifier counter α of "A" and the job counter n of "2" is appended, is stored in the storage device 204, the job transmission/reception unit 701 transmits the above-described print job to the printing apparatus 131.

On the other hand, when it is determined that a comment is inserted at step S811 (YES), the process proceeds to step S901 in FIG. 9. At step S901, the job transmission/reception unit 701 transmits the print job read out by the transmission job control unit 703 at step S810.

In the present embodiment, since the final page is incorporated in the print job to which the job number of "form A job 3" is appended, the above-described print job is transmitted to the printing apparatus 131 at step S901.

At step S902, the job storage unit 702 removes from the storage device 204 the print job, to which a job number including the same form identifier as in the print job transmitted at step S901 is appended, out of the print jobs stored in the storage device 204.

Furthermore, at step S903, the transmission job control unit 703 determines whether there is next print data. Specifically, it is determined whether the storage device 204 stores print job to which a job number including other form identifier is appended.

When it is determined at step S903 that there is next print data (YES), the process proceeds to step S904. At step S904, the transmission job control unit 703 extracts a next form identifier from the form identifier list, and assigns the next form identifier to the form identifier counter a. In the present embodiment, the next form identifier "B" is extracted from the form identifier list and assigned to the form identifier counter a. Then, the process returns to step S802, and the same processes are executed repeatedly.

On the other hand, when it is determined that there is no next print data at step S903 (NO), the job transmission control process ends.

<7. Summary>

As is clear from the above-described explanations, the information processing system according to the present embodiment has the following features.

(1) Print process is performed via a general-purpose OS print system so that a printing in large volume is realized in an open system environment;

(2) Print data are divided into print jobs each including predetermined pages or less by an application on an upstream side of the general-purpose OS print system so as to respond to a restriction of the general-purpose OS print system;

(3) The application on the upstream side of the general-purpose OS print system and an application on a downstream side of the general-purpose OS print system executes print processes in a unit of a print job so as to speed up the print process;

(4) The application on the downstream side of the general-purpose OS print system has a function of rearranging an output order of the print jobs in the order upon division so as to handle the problem that the general-purpose OS print system does not ensure the output order of the print jobs;

(5) The application on the upstream side adds information indicating the order upon division to the print jobs so that the application on the downstream side can rearrange the output order; and (6) The application on the upstream side inserts a comment into the final page of the print data so as to handle the problem that the application on the downstream side cannot identify the final print job in the case the print process is performed in a unit of a print job.

Accordingly, in the open system environment the print process can be sped up. Moreover, since it becomes unnecessary to provide a dedicated application for transferring information from the upstream side application to the downstream side application, the print process can be realized at low cost.

[Second Embodiment]

In the first embodiment, the information indicating the final page is inserted in the final page as a comment. However, the present invention is not limited to this.

As long as the application on the downstream side can identify the final page, an other method may be employed. However, in order to realize the print process shown in the above-described first embodiment, the following conditions are required to be satisfied.

(1) Since the downstream side application receives the print jobs via the general-purpose OS print system 212, the information indicating the final page is required to be inserted in a statement that will not be deleted in the general-purpose OS print system 212;

(2) Since the print process is performed in a unit of a print job, the upstream side application can identify the final page when the final page arrives at the upstream side application. Accordingly, the information indicating the final page is required to be a statement that can be inserted into the final page; and (3) Since the print jobs received by the downstream side application are printed out by the printing apparatus, the information indicating the final page is required to be inserted into the final page in a form that will not be printed when the print jobs are printed out.

Meanwhile, as the statement that satisfy the above conditions, for example, a PJL (Printer Job Language) statement is mentioned other than the "comment statement" explained in the first embodiment. However, as long as a statement satisfies the above conditions, the statement is not limited to the comment statement or the PJL statement.

Further, the present invention is not limited to these embodiments, but various variations and modifications may be made without departing from the scope of the present invention.

The present application is based on and claims the benefit of priority of Japanese Priority Application No. 2013-264029 filed on Dec. 20, 2013, the entire contents of which are hereby incorporated by reference.

What is claimed is:

1. A non-transitory computer-readable storage medium storing a program including computer readable instructions, which when executed, configure at least one processor of an information processing apparatus to perform a process of processing print data, by a general-purpose operating system and transmitting the processed print data to at least one printing apparatus, the process comprising:

receiving, using the at least one processor, the print data including plural pages serially from head pages;

outputting, using the at least one processor, data of a desired number of pages as a file, each time a number of pages received at the receiving reaches the desired number, to the general-purpose operating system with information indicating an order of output, wherein the receiving further includes, counting a number of pages of the print data that are converted into a data format suitable for the general-purpose operating system, adding a print data identifier and a job processing order, each time results of the counting reaches a number of pages corresponding to a desired size set by the general-purpose operating system can process, generating a plurality of print jobs including the counted print data, inserting, in a case where a final page of the print data is received, in the final page a statement, which is not printed by the printing apparatus and is detectable by a program for transmitting the print data processed by the general-purpose operating system to the printing apparatus.

2. The non-transitory computer-readable storage medium as claimed in claim 1, wherein the outputting data further includes reordering the data in accordance with the information indicating the order of output prior to transmitting the processed print data to the at least one printing apparatus.

3. A non-transitory computer-readable storage medium storing a program including computer readable instructions, which when executed, configure at least one processor of an information processing apparatus to perform a process of processing print data by a general-purpose operating system and transmitting the processed print data to at least one printing apparatus, the process comprising:

storing, using the at least one processor, in a case where plural fries are outputted from the general-purpose operating system, serially the outputted files;

retrieving serially, using the at least one processor, the stored files based on information added to the stored files and indicating an order of output, and transmitting the retrieved files to the printing apparatus; and determining, using the at least one processor, in a case where a desired statement is extracted from a page incorporated in a retrieved file, that the file in which the page is incorporated is a final file of the print data, outputting data of a desired number of pages as a file, each time a received number of pages reaches a number of pages corresponding to the desired number, to the general-purpose operating system with information indicating an order of output to the general-purpose operating system and the order of transmission;

wherein the receiving further includes, counting a number of pages of the print data that are converted into a data format suitable for the general-purpose operating system, adding a print data identifier and a job processing order each time results of the counting reaches a number of pages corresponding to a desired size set by the general-purpose operating system, generating a plurality of print jobs including the counted print data based on results of the adding; and the outputting further includes inserting, in a case where a final page of the print data is received in the final page a statement, which is not printed by the printing apparatus and is extracted, as the desired statement.

4. The non-transitory computer-readable storage medium as claimed in claim 3, wherein the retrieving serially further includes reordering the stored plural files in accordance with the information indicating the order of output prior to the transmitting the retrieved files to the printing apparatus.

5. An information processing method in an information processing apparatus including at least one processor for processing print data by a general-purpose operating system and transmitting the processed print data to at least one printing apparatus, the method comprising:

receiving, using the at least one processor, the print data including a plurality of pages serially from head pages;

outputting, using the at least one processor, data of a desired number of pages as a file, each time a number of received pages reaches the desired number, to the general-purpose operating system with information indicating an order of output;

storing, using the at least one processor, in a case where the plural files are outputted from the general-purpose operating system, serially the outputted files;

retrieving serially, using the at least one processor, the stored files based on information added to the stored files and indicating the order of output, and transmitting the retrieved files to the at least one printing apparatus; and determining, using the at least one processor, in a case where a desired statement is extracted from a page incorporated in at least one of the retrieved files, that the file in which the page is incorporated is a final file of the print data, wherein the receiving further includes,
  counting a number of pages of the print data that are converted into a data format suitable for the general-purpose operating system,
  adding a print data identifier and a job processing order each time results of the counting reaches a number of pages corresponding to a desired size set by the general-purpose operating system,
  generating a plurality of print jobs including the counted print data based on results of the adding; and
  the outputting further includes inserting, in a case where a final page of the print data is received in the final page a statement, which is not printed by the printing apparatus and is extracted, as the desired statement.

6. The method as claimed in claim 5, wherein the retrieving serially further includes reordering the stored plural files in accordance with the information indicating the order of output prior to the transmitting the retrieved files to the at least one printing apparatus.

7. An information processing apparatus for processing print data by a general-purpose operating system and transmitting the processed print data to at least one printing apparatus, the information processing apparatus comprising:
  a memory having computer readable instructions stored thereon; and
  at least one processor configured to execute the computer readable instructions to,
    receive the print data, the print data including a plurality of pages serially from head pages;
    output data of a desired number of pages as a file each time a number of pages received reaches the desired number to the general-purpose operating system with information indicating an order of output;
    store, in a case where the plural files are outputted from the general-purpose operating system, serially the outputted files;
    retrieve serially the stored files based on information added to the stored files and indicating the order of output;
    transmit the retrieved files to the printing apparatus; and
    determine, in a case where a desired statement is extracted from a page incorporated in a retrieved file, that the file in which the page is incorporated is a final file of the print data; wherein
    the receiving further includes,
      counting a number of pages of the print data that are converted into a data format suitable for the general-purpose operating system,
      adding a print data identifier and a job processing order, each time results of the counting reaches a number of pages corresponding to a desired size set by the general-purpose operating system, and
      generating a plurality of print jobs including the counted print data; and
    the outputting further includes inserting, in a case where a final page of the job is received, in the final page a statement, which is not printed by the printing apparatus and is extracted, as the desired statement.

8. The information processing apparatus as claimed in claim 7, wherein the retrieving serially further includes reordering the stored files in accordance with the information indicating the order of output prior to the transmitting the retrieved files to the printing apparatus.

9. An information processing system comprising:
  at least one printing apparatus; and
  a program for causing a computer in an information processing apparatus to perform a process of processing print data by a general-purpose operating system and transmitting the processed print data to the at least one printing apparatus, wherein the program includes computer readable instructions that when executed causes at least one processor of the computer to,
    store, using the at least one processor, in a case where plural files are outputted are outputted from the general-purpose operating system, serially the outputted files;
    retrieving serially, using the at least one processor, the stored files based on information added to the stored files and indicating an order of output, and transmitting the retrieved files to the printing apparatus; and
    determining, using the at least one processor, in a case where a desired statement is extracted from a page incorporated in a retrieved file, that the divided job in which the page is incorporated is a final file of the plurality of print data.

10. The information processing system as claimed in claim 9, wherein the program includes a second program including second computer readable instructions, which when executed, configure the at least one processor to:
  receive, using the at least one processor, the print data, which include plural pages, serially from head pages; and
  outputting, using the at least one processor, data of a desired number of pages as a file, each time a received number of pages reaches a number of pages corresponding to the desired number, to the general-purpose operating system with information indicating an order of output to the general-purpose operating system and the order of transmission; wherein
  the receiving further includes,
    counting a number of pages of the print data that are converted into a data format suitable for the general-purpose operating system,
    adding a print data identifier and a job processing order, each time results of the counting reaches a number of pages corresponding to a desired size set by the general-purpose operating system, and
    generating a plurality of print jobs including the counted print data;
  the outputting further includes inserting in a case where a final page of the print data is received, in the final page a statement, which is not printed by the printing apparatus and is extracted during the determining, as the desired statement.

11. The information processing system as claimed in claim 9, further comprising:

an information processing apparatus including the computer configured to execute the program.

12. The information processing system as claimed in claim 9, wherein the retrieving serially further includes reordering the stored plural files in accordance with the information indicating the order of output prior to the transmitting the retrieved files to the printing apparatus.

* * * * *